Aug. 28, 1956     M. CAPORALE     2,761,121

DOOR-CONTROLLED SIGNALING DEVICE FOR AUTOMOTIVE VEHICLES

Filed May 3, 1954

MARIO CAPORALE
INVENTOR.

BY Karl F. Ross

AGENT

United States Patent Office 2,761,121
Patented Aug. 28, 1956

2,761,121

DOOR-CONTROLLED SIGNALING DEVICE FOR AUTOMOTIVE VEHICLES

Mario Caporale, Milan, Italy

Application May 3, 1954, Serial No. 427,179

Claims priority, application Italy April 3, 1954

2 Claims. (Cl. 340—52)

The present invention relates to an optical or acoustical automatic signaling device adapted to be energized by the opening of car doors and more particularly of automobile doors.

It is desirable that upon the opening of the car doors an optical signal should be emitted in order to avoid accidents caused by oncoming vehicles. The separate operation of special knobs for this purpose is frequently neglected, thus causing serious dangers to arise.

It is an object of the present invention to provide means for automatically and anticipatorily signaling the opening of a car door by actuating acoustical or optical signaling means in response to the opening operation of these doors.

It is another object of the present invention to signal by means of a warning light situated on the dash board or on the inner wall of the vehicle if the handles or the pushbuttons for the opening of the door are erroneously operated during the travel of the car or while the latter is stopped.

Another object of the invention is to warn the driver during the travel of the vehicle of the incomplete closure of the car doors or of the omission of operation of the safety lock of the door.

It is a further object of the invention to provide a device which may also serve as a burglary prevention device, said signaling means being so positionable as to warn the driver of any omission of operating the safety lock, means being preferably provided to interrupt said signals.

Such devices have proved very useful for cars provided with a single door on each side whose opening radius is very large, whereby the danger of other cars running into the door or into the passengers attempting to alight from the car is increased. The device is considered to be particularly useful for American cars traveling on narrow streets, such as the European ones, where the alighting from the car becomes risky in view of the high speed of unexpectedly arriving cars.

It is further advisable to use the device in connection with public utility cars, such as taxi-cabs and omnibuses, where the passengers, as soon as the destination is reached, speedily alight by opening the doors in all directions without taking any precaution with respect to unexpectedly arriving vehicles, which latter, owing to the driver's surprise, are obliged to effect speedy maneuverings, which may cause dangerous incidents.

In accordance with a feature of this invention there is provided an alarm circuit, which may include optical, acoustical or other signaling means, adapted to be closed by two series-connected contact pairs of which one is closed when the ignition key is removed from its socket, the other pair being closed when a movable member of a safety lock for any of the car doors is displaced into an unoperated position. The movable member may form part of the usual pushbutton-type door check which in well-known manner is rendered inoperative when an inner door handle is actuated by an occupant of the vehicle desiring to open the door. If the door check is not immediately reset, the alarm device will continue to function in order to remind the operator to close the safety lock. Preferably, in accordance with another feature of the invention, the alarm circuit is broken after a predetermined interval by means of a suitable time relay.

Further features and advantages of the invention will be made evident in the following disclosure and a full comprehension thereof may be best achieved by consideration of the accompanying drawing, which is for illustrative purposes only and not limitative, wherein.

Figure 1:
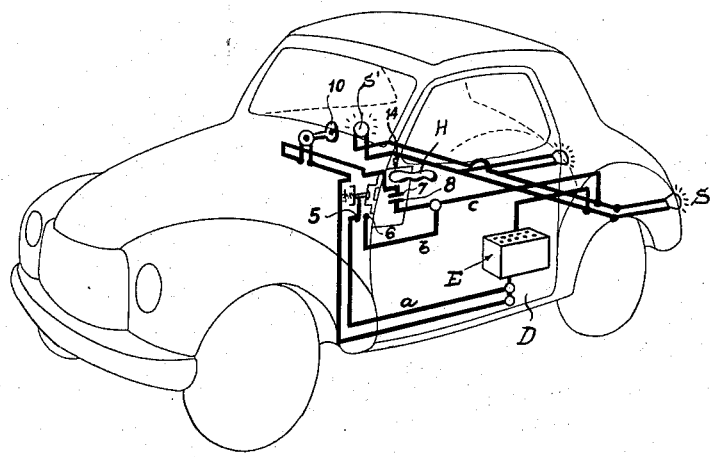
Fig. 1 is a diagrammatical perspective view of a motor car provided with the electrical circuit and device according to the invention.
Figure 2:
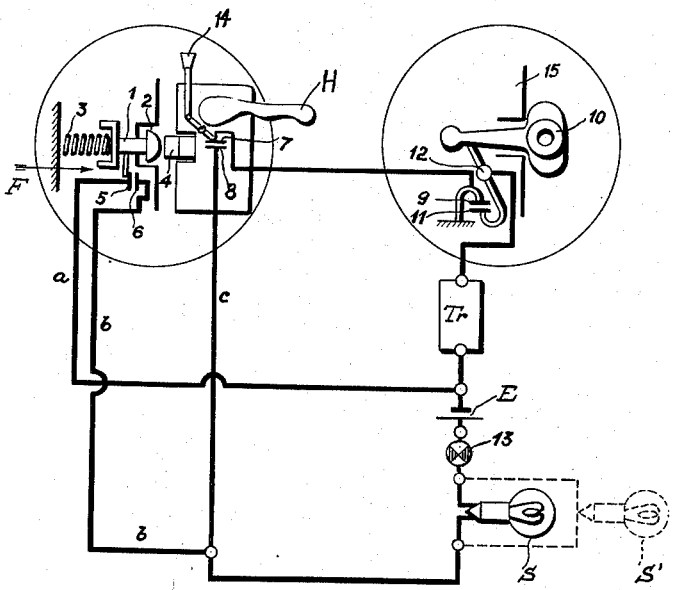
Fig. 2 is a detailed view of the electrical circuit elements according to the invention.

Referring now more particularly to the drawing, a pin 1 is provided in the lock 2 of a conventional door closure, said pin being axially guided in a guiding hole so as to be urged under pressure of a spring 3, according to the arrow F, toward the movable lock bolt 4. A contact member 5 is secured to the pin 1, and a complementary contact member 6 is fixedly secured to the car frame. The contact 5 is connected through the electrical conducting wire $a$ and through the electrical current source E to a signaling means S in the form of an optical lamp, suitable to emit, if connected to other devices in any known manner, intermittent light. The other contact 6 is connected through the conducting wire $b$ to the same signaling means S to close the circuit.

According to a further feature of the invention, a contact member 7 is secured to the movable member 14 of the safety check of this lock which in known manner may shift into an inoperative position upon the opening of door D from within and which may be resettable from without by means of a key. Another contact member 8 is secured to the stationary frame of the lock; the contact 7 is connected through the conducting wire $c$ to another contact member 9 secured to the stationary socket 15 of the starting key 10, which contact 9 is able to be connected with an armature 11 suitably pivoted at 12 and adapted to swing around its pivot so as to be spaced away from the contact 9 by the starting key 10 when the latter is inserted in starting position. The armature 11 is electrically connected to a terminal of a time relay Tr whose other terminal in turn is connected to the current source E and to the signal means S by way of an interrupter 13.

When the operator leaves the car and draws out the starting key, the opening of the door by means of handle H causes the movable member 14 of said lock to shift, whereby the contact 7 engages the contact 8, the signal means S and the time relay Tr being energized. Thus suitable optical signals may be emitted, which may be made intermittent by the series connection of device 13 in said circuit. In this way the driver is warned that he has omitted to lock the safety check 14. The time relay Tr interrupts the circuit after a certain time. If there is connected, for instance in parallel connection with the terminals of the lamp S, another lamp S' situated on the dash board or in the interior of the car, the driver may be warned when one of the passengers, for instance a child, may attempt to open during the travel any other door, since similar circuits may be provided for each door.

The first lamp, if situated on the rear part of the car, serves to warn an oncoming car on the road that the opening of one of the doors is occurring. This lamp may be combined with a second lamp and the interrupter 13 may be arranged so as to energize alternately both lamps, so that a special warning signal may be created.

When the door D is opened, the pin 1 is in turn caused to shift, so that the contacts 5 and 6 contact each other, energizing independently the signaling lamp or lamps S'.

The lamps shown in the drawing are representative of any optical or acoustical signaling means.

Although a preferred embodiment of the invention has been described, various modifications and substitutions may be effected without departing from the underlying inventive concept; it is not intended therefore to be limited to the specific disclosure contained herein, and hereby the rights are reserved to all such modifications and substitutions as properly come within the scope of the appended claims.

I claim:

1. In an automotive vehicle, in combination, a door provided with a safety lock member movable between an operated and an unoperated position, an ignition key, a socket for said key, first contacts at said socket adapted to be closed by said key upon removal thereof from said socket, second contacts at said door adapted to be closed by said movable member in said unoperated position thereof, alarm means, and an energizing circuit for said alarm means including both said first and said second contacts in series, thereby operating said alarm means upon displacement of said member into its unoperated position with said key removed from said socket.

2. The combination according to claim 1, further including delayed-action relay means in said energizing circuit for deactivating said alarm means after a predetermined period.

References Cited in the file of this patent

UNITED STATES PATENTS

| | | |
|---|---|---|
| 2,339,170 | Jacobs | Jan. 11, 1944 |
| 2,349,740 | McCollum | May 23, 1944 |
| 2,427,040 | Billman | Sept. 9, 1947 |
| 2,437,777 | Zajc | Mar. 16, 1948 |
| 2,613,258 | Azano | Oct. 7, 1952 |
| 2,679,039 | Koppl | May 18, 1954 |